United States Patent Office 3,171,789
Patented Mar. 2, 1965

3,171,789
INHIBITION OF THE CORROSION OF METALS BY STEAM AT HIGH TEMPERATURES
John Nelson Wanklyn, Abingdon, and Colin Frederick Britton, Grove, near Wantage, England, assignors to United Kingdom Atomic Energy Authority, London, England
No Drawing. Filed Dec. 4, 1961, Ser. No. 157,008
Claims priority, application Great Britain, Dec. 9, 1960, 42,573/60
10 Claims. (Cl. 176—38)

The invention relates to the inhibition of the corrosion of metals by steam at high temperatures and pressures.

The invention also relates to coolants for nuclear reactors and to methods of operating nuclear reactors, and is particularly concerned with coolants comprising pressurised dry steam, and with methods of operating nuclear reactors cooled by pressurised dry steam in which the coolant comes into contact with metals such as zirconium which are corrodible by the coolant.

According to the invention, a method of inhibiting the corrosion of metals by steam at high temperature and high pressure consists in introducing into the steam boric acid.

Also according to the invention, a coolant for a nuclear reactor comprises pressurised dry steam and boric acid, preferably boric acid in which the boron consists essentially of the boron-11 isotope.

Also according to the invention, a method of operating a nuclear reactor cooled by pressurised dry steam, in which the coolant comes into contact with a metal which is corrodible thereby, comprises introducing boric acid into the coolant, the boron in the boric acid preferably consisting essentially of the boron-11 isotope.

Since ordinary boron has a high neutron absorption cross-section due to its boron-10 content, it will normally be necessary to use boric acid of reduced, or preferably negligible, boron-10 content in a nuclear reactor coolant or in the operation of a reactor in accordance with the invention.

Boric acid is volatile in steam at high temperatures, and may be introduced into the steam by contacting it with boric oxide, or an acid derived therefrom by hydration, e.g., ortho- or meta-boric acid, or a simple or complex salt of such an acid, e.g., a borate or borosilicate, which may be in crystalline form or in the form of a glass.

The proportion of boric acid which is necessary to produce an inhibiting effect on corrosion depends on the temperature of the steam and the nature of the metal. An amount of boric acid equivalent to as little as 3 parts by weight of boric oxide per 1000 parts of the steam has an inhibiting effect on the corrosion of pure zirconium in steam at 500° C. and 1000 p.s.i.

Other metals for which corrosion by pressurised dry steam at high temperatures is inhibited by the introduction of boric acid into the steam include pure beryllium and pure aluminium, and also those zirconium alloys which have a high resistance to pressurised water at high temperature, but limited resistance to steam at higher temperatures, such as the alloys known as Zircaloy, which contain up to 2% by weight of tin and lesser proportions of iron, chromium and nickel.

The nature of the invention and the manner in which it is to be performed are illustrated by the following examples, which describe the inhibition of the corrosion of various metals by pressurised dry steam.

Example I

Identical specimens were cut from 0.03 inch thick sheets rolled from the same crystal bar of pure zirconium produced by the iodide process, and were exposed in the as-rolled condition in closed stainless steel tubes at 500° C., in the presence of sufficient steam to give a pressure of 1000 p.s.i., for 24 hours. It was found that the presence of boric acid or finely powdered borosilicate glass in the autoclave had a strongly inhibiting effect on corrosion of the zirconium. Silica, present as either the solid or as a colloidal solution, however, had no effect, and nor had potassium silicate. The presence of 1 g. of borosilicate glass (containing about 0.13 g. boric oxide), or 1 g., 0.1 g. or 10 mg. of boric acid (equivalent to 1.13 g., 0.113 g. and 11.3 mg. boric oxide, respectively) in a tube containing 0.3 g. of steam reduced the weight gain of the zirconium specimens from 2500–5000 mg./sq. dm. to about 30 mg./sq. dm. The presence of 1 mg. boric acid (equivalent to 1.13 mg. boric oxide) caused the weight gain to rise only slightly (compared with that for 10 mg. boric acid), to about 60 mg./sq. dm.

Example II

On a larger scale, the presence of 2.4 g. boric acid (equivalent to 2.7 g. boric oxide) or 30 g. borosilicate glass (containing about 4 g. boric oxide) in a stainless steel autoclave containing 7.5 g. steam at 500° C. and 1000 p.s.i. reduced the weight gain of pure zirconium specimens (prepared as in Example I) from 5000–6000 gm./sq. dm. in one day in the absence of inhibitor, to the values given in the following table:

| Days | 1 | 2 | 4 | 5 | 8 | 12 | 19 | 26 | 36 | 40 |
|---|---|---|---|---|---|---|---|---|---|---|
| Boric acid | | | 59 | | 71 | 78 | 95 | 102 | | 107 |
| Glass | 36 | 43 | | 51 | | 69 | 84 | 117 | 130 | |

Specimens transferred for one day to an autoclave containing no inhibitor, after 2 days in the presence of the borosilicate glass, showed a weight gain of 4100 mg./sq. dm., indicating that the continuous presence of the inhibitor is necessary for the inhibiting effect. Similarly, specimens transferred for one day to an autoclave containing no inhibitor after 44 days in the presence of boric acid developed severe localised pitting, particularly at the edges of the specimen.

Further experiments showed that boric acid inhibited further corrosion of zirconium by steam at 500° C. and 1000 p.s.i. after exposure of zirconium specimens, in the absence of boric acid, to steam at 500° C. and 1000 p.s.i. for 4 h. or 6 h., or to steam at 500° C. and atmospheric pressure for 2 days or 12 days.

Example III

Specimens of Zircaloy II, an alloy of zirconium containing, as major components other than zirconium, 1.4% tin, 0.12% iron, 0.10% chromium and 0.05% nickel, were exposed to steam at 500° C. and 1000 p.s.i. as in Example II in the presence of borosilicate glass. The weight gains in mg./sq. dm. of the specimens compared with those of identical specimens exposed in the absence of borosilicate glass, are shown in the following table:

| Days | 2 | 4 | 6 | 12 | 17 | 24 | 32 |
|---|---|---|---|---|---|---|---|
| Glass | 40 | 50 | 70 | | 120 | 150 | 190 |
| No glass | 60 | 90 | 110 | 160 | | | |

These results show an average rate of weight gain (after the second day) of only 5 gm./sq. dm./day in the presence of the borosilicate glass, compared with 10 mg./sq. dm./day in the absence of the glass.

The analyses of the metals used in Examples I, II and

III are shown in more detail in the following table, to the nearest 0.1% by weight:

|  | Pure "iodide" zirconium | Zircaloy II |
|---|---|---|
| Tin | 0.00 | 1.40 |
| Iron | 0.03 | 0.12 |
| Chromium | 0.01 | 0.10 |
| Nickel | 0.01 | 0.05 |
| Copper | 9.00 |  |
| Tungsten |  |  |
| Titanium | 0.00 | 0.01 |
| Hafnium | 0.00 | <0.01 |
| Aluminium | 0.01 | <0.01 |
| Total of other metals | <0.01 | <0.01 |
| Carbon | <0.04 | 0.01 |
| Oxygen | 0.01 | 0.11 |
| Nitrogen | 0.00 | 0.01 |
| Chlorine | 0.01 |  |
| Iodine | 0.01 |  |
| Hydrogen | 0.01 | 0.00 |
| Zirconium—at least | 99.85% | 98.16% |

*Example IV*

A specimen of high purity (99.995%) aluminium sheet was exposed to steam at 500° C. and 1000 p.s.i. as in Example I, in the presence of 10 mg. of boric acid, for 24 h. A weight gain of only 1 mg./sq. dm. was obtained. A similar specimen exposed in the absence of boric acid was completley oxidised in 24 h.

*Example V*

Two specimens of beryllium sheet prepared from electrolytically-produced beryllium flake, which had been leached with oxalic acid to remove impurities, were exposed to steam at 500° C. and 1000 p.s.i. as in Example II, in the presence of 2.4 g. of boric acid, for 24 h. Weight gains of 76 mg./sq. dm. and 37 mg./sq. dm. were obtained. Two similar specimens exposed in the absence of boric acid were completely oxidised in 24 h.

We claim:

1. A method of inhibiting the corrosion of metals by dry steam at super-atmospheric pressure comprising introducing boric acid into the steam.

2. A method of inhibiting the corrosion of essentially pure zirconium by dry steam at super-atmospheric pressure comprising introducing boric acid into the steam.

3. A method of inhibiting the corrosion of a zirconium alloy, which is resistant to corrosion by pressurised water at high temperature, but which is less resistant to dry steam at super-atmospheric pressure, which comprises introducing boric acid into the dry steam.

4. A method of inhibiting the corrosion of a zirconium alloy, of the type known as zircalloy, by dry steam at super-atmospheric pressure comprising introducing boric acid into the steam.

5. A method according to claim 1, in which the metal is beryllium.

6. A method according to claim 1, in which the metal is aluminium.

7. In a reactor, an anti-corrosion coolant comprising pressurised dry steam, in which the coolant comes into acid being such as not to appreciably affect the reactor reactivity.

8. A coolant according to claim 7, in which the boron in the boric acid consists essentially of the boron-11 isotope.

9. A method of operating a nuclear reactor cooled by pressurised dry steam, in which the coolant comes into contact with a metal which is corrodible thereby, which comprises introducing boric acid into the coolant.

10. A method according to claim 9 in which the boron in the boric acid consists essentially of the boron-11 isotope.

References Cited in the file of this patent

UNITED STATES PATENTS

| 1,666,523 | Bailey | Apr. 17, 1928 |
| 1,724,551 | Bellis | Aug. 13, 1929 |
| 1,927,842 | McDermott | Sept. 11, 1933 |
| 2,727,996 | Rockwell et al. | Dec. 20, 1955 |
| 2,796,411 | Zirkle et al. | June 18, 1957 |
| 2,886,503 | Szilard et al. | May 12, 1959 |
| 2,920,025 | Anderson | Jan. 5, 1960 |
| 2,998,367 | Untermyer | Aug. 29, 1961 |

FOREIGN PATENTS

| 879,282 | Great Britain | Oct. 11, 1961 |

UNITED STATES PATENT OFFICE
CERTIFICATE OF CORRECTION

Patent No. 3,171,789                         March 2, 1965

John Nelson Wanklyn et al.

It is hereby certified that error appears in the above numbered patent requiring correction and that the said Letters Patent should read as corrected below.

Column 4, line 17, for "anti-corrosion" read -- anti-corrosive --; line 18, strike out ", in which the coolant comes into" and insert instead -- and boric acid, the amount of boric --.

Signed and sealed this 7th day of February 1967.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,171,789                                March 2, 1965

John Nelson Wanklyn et al.

It is hereby certified that error appears in the above numbered patent requiring correction and that the said Letters Patent should read as corrected below.

Column 4, line 17, for "anti-corrosion" read -- anti-corrosive --; line 18, strike out ", in which the coolant comes into" and insert instead -- and boric acid, the amount of boric --.

Signed and sealed this 7th day of February 1967.

(SEAL)
Attest:

ERNEST W. SWIDER                                EDWARD J. BRENNER
Attesting Officer                                      Commissioner of Patents